R. F. REED.
LEVEL.
APPLICATION FILED FEB. 10, 1915.
1,206,593.
Patented Nov. 28, 1916.
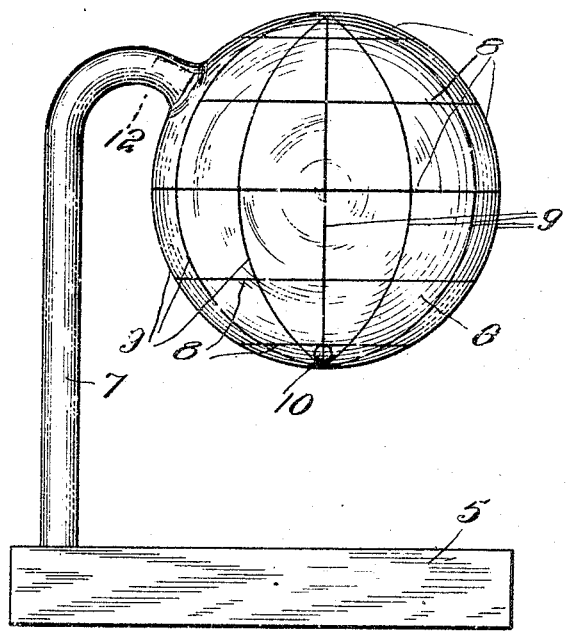
Fig. 1.
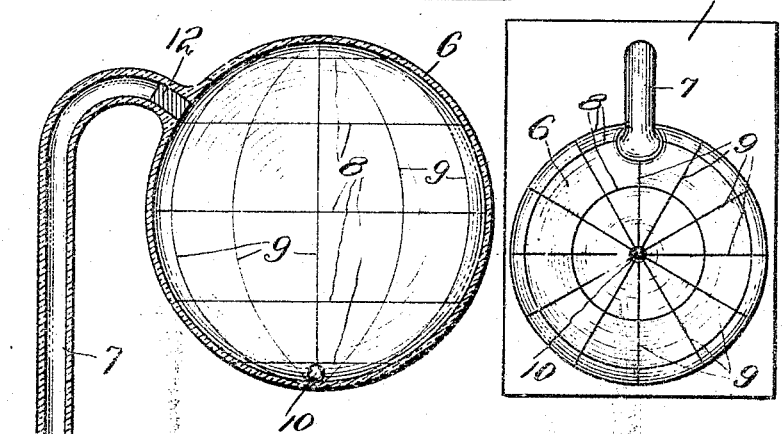
Fig. 2.
Fig. 3.
Inventor
R. F. Reed
By Victor J. Evans
Attorney
Witnesses

UNITED STATES PATENT OFFICE.

RAINIER F. REED, OF DES MOINES, IOWA.

LEVEL.

1,206,593.  Specification of Letters Patent.  Patented Nov. 28, 1916.

Application filed February 10, 1915.  Serial No. 7,341.

*To all whom it may concern:*

Be it known that I, RAINIER F. REED, a citizen of the United States, residing at Des Moines, in the county of Polk and State of Iowa, have invented new and useful Improvements in Levels, of which the following is a specification.

The invention relates to levels, and more particularly to the class of spherical levels.

The primary object of the invention is the provision of a level of this character wherein horizontal or perpendicular planes, slopes, variations thereof and the angles of the inclination of the same may be readily and quickly determined with accuracy.

Another object of the invention is the provision of a level of this character wherein the construction thereof is novel in form to enable the user to determine true lines in any direction, thereby making said level useful to carpenters and other tradesmen, and also permitting one to known with accuracy whether or not the work is level from all directions.

A further object of the invention is the provision of a level of this character which will enable a person to determine with accuracy any angle of slope from horizontal to perpendicular in two directions at right angles to each other.

A still further object of the invention is the provision of a level which is simple in construction, readily and easily manipulated, and capable of reading thereof with accuracy, thoroughly reliable and efficient in operation, and inexpensive in manufacture.

With these and other objects in view, the invention consists in the construction, combination and arrangement of parts as will be hereinafter fully described, illustrated in the accompanying drawing, and pointed out in the claim hereunto appended.

In the drawing: Figure 1 is a side elevation of a level constructed in accordance with the invention. Fig. 2 is a vertical sectional view therethrough. Fig. 3 is a plan view thereof.

Similar reference characters indicate corresponding parts throughout the several views in the drawing.

Referring to the drawing in detail, the level comprises a base 5, preferably made from hard wood, although it may be made from any other suitable material, and of any desired shape, for supporting a hollow spherical body 6, preferably made from glass, and having formed integral therewith a hollow goose neck 7 which forms the stem for supporting the body 6, and this stem is suitably fixed in the base 5 so that it may be detached therefrom if desired.

The body has etched or otherwise marked thereon exteriorly of the same meridian and latitude lines 8 and 9, respectively, which serve as graduated marks or a scale, with which coöperates a displaceable element 10, which is within the body 6, and in this instance is in the form of a lead ball, although the said element may be a liquid, mercury, or any heavy metal such as lead, gold, platinum, or the like, to serve as an indicator for coöperation with the graduated marks or the scale exteriorly on the body 6 when the level is used for determining perpendicular, horizontal, or any other lines, slopes, variations thereof, or the angles of inclination of the same. The level is capable of permitting the user to determine an angle or slope from horizontal or perpendicular in two directions at right angles to each other, or from any direction. It will be apparent that the element within the body changes its position when the said body is turned in any direction so that the element will coöperate with the scale line to indicate when the base of the level is disposed at any predetermined angle, slope or in true horizontal or perpendicular position.

The indicator element is introduced into the body 6 through the stem 7, and thereafter the same is closed through the medium of a stopper 12 which is forced within the stem to occupy a position at the inner end thereof next to the body or at the point of communication of the neck therewith, and thereafter the stem is connected to the base 5 so that the level is ready for use.

From the foregoing description, taken in connection with the accompanying drawing, the construction and manner of use of the device will be clearly understood, and therefore a more extended explanation has been omitted.

What is claimed is:

A level comprising a base, a spherical transparent hollow body having external meridian and latitude lines thereon indicative of a scale, a tubular stem having an open end detachably fitted within the base, said stem being formed with a goose neck merging into the transparent hollow body for suspending the same at one side of the stem and elevated above the base, a spherical element insertible through the stem into the body and freely movable therein for coöperating with said scale, and a plug insertible in the stem for closing the communication between the stem and the body at a point where the goose neck merges into the body.

In testimony whereof I affix my signature in presence of two witnesses.

RAINIER F. REED.

Witnesses:
GEORGE D. NEWCOM,
C. A. STEVENS.